May 8, 1934. W. R. COLLINGS 1,958,034
PROCESSING CALCIUM CHLORIDE SOLUTION
Filed July 3, 1933
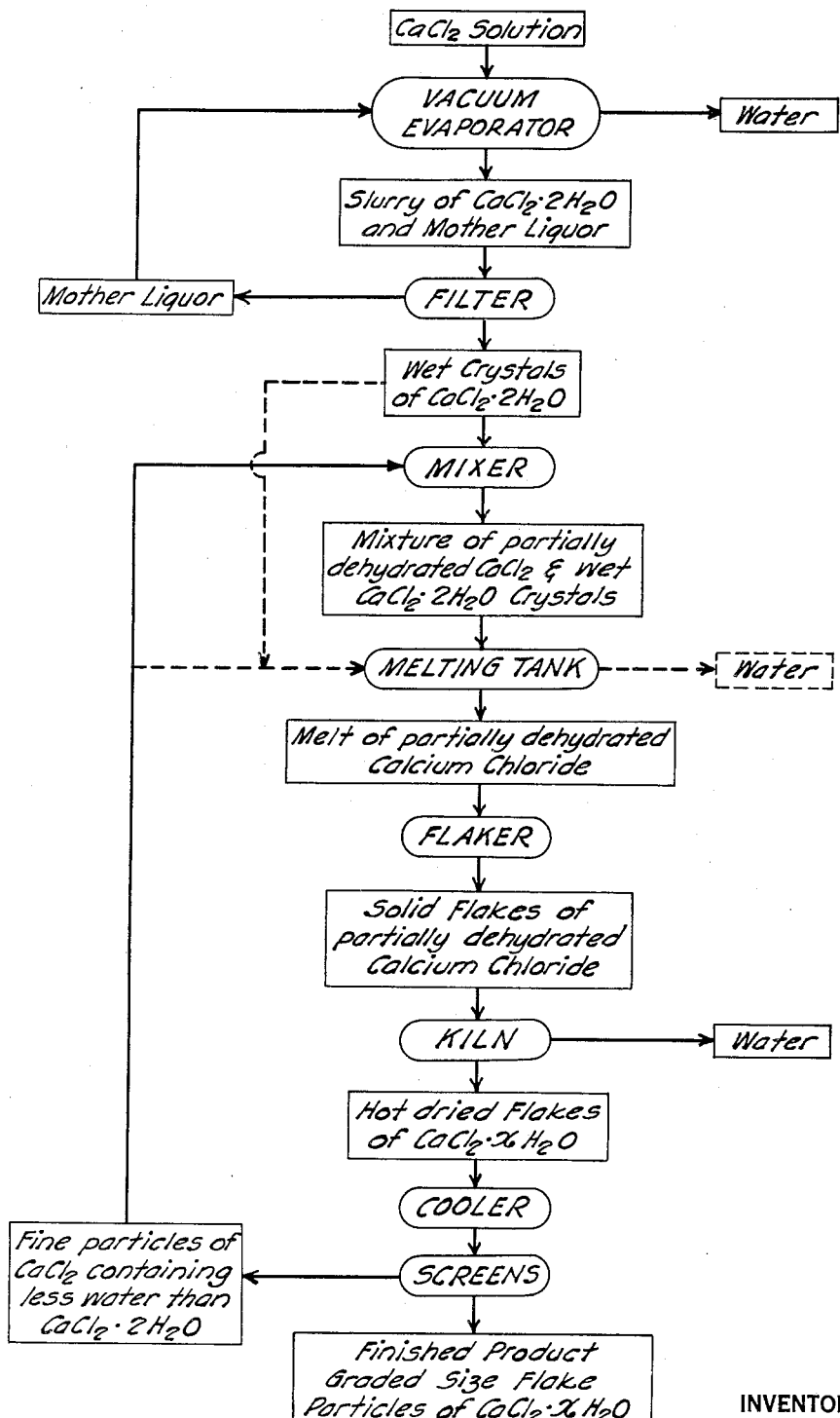
INVENTOR
*William R. Collings*
BY
*Thomas Griswold Jr.*
ATTORNEY Patented May 8, 1934

1,958,034

UNITED STATES PATENT OFFICE 1,958,034

PROCESSING CALCIUM CHLORIDE SOLUTION

William R. Collings, Midland, Mich., assignor to The Dow Chemical Company, Midland, Mich., a corporation of Michigan Application July 3, 1933, Serial No. 678,785

5 Claims. (Cl. 23—90)

My invention relates to improvements in the preparation of calcium chloride in the form of free-flowing particles containing water of crystallization which exhibit reduced tendency to cake or coalesce in the package. One of the objects of my invention is to provide a method by which aqueous solutions of calcium chloride may be worked up economically to recover the calcium chloride content thereof in the form of solid substantially non-caking hydrated particles or granules.

In the prevailing process of working up calcium chloride solutions to recover solid hydrated forms of the salt therefrom, the solution is boiled down until the concentration of calcium chloride therein is between about 71 and 73 per cent. At this concentration the hot solution may be solidified as a layer upon the cooled surface of a revolving flaker drum and scraped therefrom in the form of flakes or particles which do not fuse at temperatures required for the removal of any or all of the remaining water of crystallization. Non-caking characteristics are then developed by further drying the flaked particles, at least superficially, by bringing them into contact with a heated current of air, specifically the products of combustion of fuel. The air-dried particles are cooled in a current of air and the cooled particles are then screened to remove the fine particles formed by abrasion in the drying kiln so as to produce a substantially dust-free product of more or less uniform size of particles. Such dried particles may contain from 76 to 80 per cent or more of calcium chloride, the balance being largely water.

In such prior process for the removal of water from calcium chloride solutions for producing a solution of such concentration that the same may be flaked in the usual way, it has been the practice first to evaporate a portion of the water by means of vacuum evaporation at temperatures below about 100° C. and then to finish the evaporation by boiling down the resulting concentrate in open kettles. The practical concentration arrived at by vacuum evaporation, at most, does not exceed about 62 per cent calcium chloride, so that a considerable portion of the evaporation requires to be carried out at the higher temperatures with relatively costly high pressure steam. The use of low pressure steam, which is often available as a waste product, has not been advantageously employed heretofore to prepare calcium chloride solutions for flaking, inasmuch as it has not been thought possible to reduce the water content sufficiently by its use.

A disadvantage of the process above briefly described is the greater cost of steam at relatively high temperatures and pressures used in reducing the water content of concentrated solutions to a point where the fluid mass obtained is capable of being flaked or otherwise comminuted to form particles that can be kiln dried without fusion. Another disadvantage is the greater corrosive effect of calcium chloride solutions upon the metal evaporating equipment at the high temperatures thus employed. Still another disadvantage is that no provision is made for economically recovering from the finished product the relatively fine or undersize particles produced by abrasion in the drying kiln that require to be separated therefrom to yield a commercially acceptable non-caking product.

I have now devised a method by which calcium chloride solutions may be more economically worked up to recover the chloride therefrom in the form of commercially acceptable non-coalescing particles or granules that are substantially free from undersize particles, wherein the use of high temperature steam evaporation and its consequent problems is largely avoided, and at the same time provision is made effectively and economically to utilize and recover the relatively fine particles of kiln screenings formed in the final drying operation. Briefly stated, my method comprises first removing water from the given calcium chloride solution by low temperature vacuum evaporation to form a slurry of crystals of the dihydrate and mother liquor. The crystals are then separated from the mother liquor, which is returned to the evaporator. The moist crystals are mixed with previously dried undersize particles of calcium chloride containing less water than the undried crystals and then the mixture is heated to form a melt suitable for flaking. The melt is formed into flakes which are kiln dried, cooled, and screened and the undersize particles, so separated, are returned to the mixing step.

The invention, then, consists in the combination of steps hereinafter more fully described and particularly pointed out in the claims, the annexed drawing and the following description setting forth in detail but one of the various modes in which the principle of my invention may be employed.

The single figure appearing in said annexed drawing illustrates diagrammatically a scheme for carrying out my improved process or method.

The following detailed description of my improved process may be readily followed by reference to the drawing. Crystals of calcium chloride dihydrate are first produced by evaporating the given aqueous solution of calcium chloride at a temperature between about 45° and 100° C. in a vacuum evaporator so as to take advantage of, and utilize, waste steam at low pressure to supply the necessary heat. The production of crystals may be carried out in continuous manner by withdrawing from the evaporator the mixture of mother liquor and crystals and continually supplying additional solution to be evaporated. The withdrawn mixture is filtered so as to separate from the crystals the mother liquor which is then returned to the evaporator.

The proportion of crystals in the mixture which may be allowed to accumulate in the evaporator should not exceed about 50 per cent, since the mixture ordinarily becomes too viscous for satisfactory operation at a higher proportion of solids. In order that crystals may be produced in readily filterable form, it is preferable to carry out the evaporation at a temperature between about 65° and 85° C. to produce a slurry of crystals and mother liquor in which the proportion of crystals does not exceed about 35 per cent. Between the temperatures referred to above, the amount of calcium chloride in the discharge from the evaporator may vary from about 58 to 68 per cent.

The amount of calcium chloride in the wet crystals of the dihydrate, $CaCl_2.2H_2O$, will vary with the degree of separation obtained between the crystals and mother liquor as well as with the concentration of the mother liquor. Ordinarily, where an Oliver vacuum filter or other similar apparatus is employed, the amount of mother liquor adhering to the separated crystals does not exceed about 10 to 15 per cent of their weight.

The crystals of dihydrate, wet with more or less mother liquor, are then brought into contact with undersize dried particles of calcium chloride, such as kiln screenings, having a materially higher $CaCl_2$ content than the wet crystals. This may be accomplished by mixing, heating, or by both mixing and heating while bringing these substances together. In the drawing, I have shown the mixing of dried particles and wet crystals as a separate operation before heating. It is generally preferable to so carry out that step, although it may be omitted if desired. I have indicated in the drawing by broken lines the direct addition of the dried particles and wet crystals to the melting tank as an alternative procedure. The proportion of dried particles is preferably chosen so as to produce a mixture, the average calcium chloride content of which is approximately 69 to 71 per cent, although these proportions may be varied, if desired. The amount of dried screenings required will vary usually from about 5 to 25 per cent or more of the weight of wet crystals to be dehydrated.

The mixture of wet crystals and dried flake screenings is then heated to, or maintained at, the temperature at which a melt is obtained that is suitable to solidify or form into flakes, such temperature normally being between about 170° and 178° C. The molten hydrated chloride so obtained is then flaked, for example, in conventional manner by contacting with the cooled surface of a revolving flaker drum whereby a film or layer of the chloride is solidified thereon, which is then scraped off in the form of flake particles.

The solidified or flaked particles, which at this stage usually do not contain more than about 30 per cent of water, may be readily dried further without fusion by maintaining them at a temperature between about 150° and 170° C., for a suitable length of time. By varying the duration of the drying treatment or temperature or both time and temperature, it is possible to produce a flake or granular product, the calcium chloride content of which may vary from about 76 to 90 per cent or more. Although various types of drying apparatus may be used to effect such drying, I prefer to employ an internally fired rotary kiln and to pass the flakes therethrough in direct contact with the products of combustion of the fuel. The temperature of the flake particles during the drying operation, however, should be kept below that at which the particles may fuse and lose their shape. As a result of such heating, the particles become superficially dried, although water may be removed also from within the particles. The hot dried particles are then conducted through a cooler or equivalent means by which the particles are brought into contact with a countercurrent of cooling air to condition the particles for screening and packaging.

Although particles may be obtained from the cooler that are more or less uniform in size, a considerable portion of them may be coarser as well as finer than the average particle size. As already indicated, it is desirable, if not necessary, to screen out such off-size particles so as to leave a finished product, the particles of which are more or less uniform in size and substantially free from undersize or dust-like particles so as to produce a commercially acceptable product. For example, particles which are small enough to pass through a sieve having slot-like openings 0.05 inch wide by 0.3 inch long preferably are separated from the bulk of the finished product and particles that do not pass through ⅜ inch mesh may be rejected or crushed to reduce their size. The finished or dried product may be graded or screened so as to conform to other particle size specifications than that given as an illustrative example. The undersize screenings, so obtained, the amount of which may be as much as 25 per cent or more of the total amount of flake being dried, are returned to the process to reduce the water content of the moist crystals of the dihydrate, as already described.

In the practical operation of my process I have found substantial savings can be effected in both steam and equipment costs whereby the cost of the product is materially reduced. For example, more than 10 per cent of the cost of producing a melt of calcium chloride suitable for flaking from 40 per cent solution may be saved as a result of the reduced use of high temperature steam. Because of the reduced use of such high temperature steam there is substantially less corrosion of apparatus. In addition to such advantages I recover and make into commercially acceptable form the undersize dry kiln screenings which are normally rejected or expensively reworked by dissolving the same in water which is added to the original liquor.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In a method of producing calcium chloride in the form of solid substantially non-caking hydrated particles containing a less proportion of water than calcium chloride dihydrate, the steps which consist in bringing moist crystals of calcium chloride dihydrate into contact with previously dried, undersize particles of hydrated calcium chloride containing less water than the dihydrate while supplying heat thereto whereby a melt is obtained, forming said melt into solidified particles, drying the same to reduce the water content thereof substantially below that of the dihydrate, separating the undersize particles from the dried product, and returning the separated undersize particles to contact with moist crystals.

2. In a method of producing calcium chloride in the form of solid substantially non-caking hydrated particles containing a less proportion of water than calcium chloride dihydrate, the steps which consist in mixing moist crystals of calcium chloride dihydrate with previously dried undersize particles of hydrated calcium chloride containing substantially less water than the dihydrate, heating the resulting mixture to melt the same, forming said melt into solidified particles, drying said particles to reduce their water content substantially below that of the dihydrate, separating the undersize particles from the dried product, and returning the separated undersize particles to said mixing step.

3. In a method of producing calcium chloride in the form of solid substantially non-caking hydrated particles containing a less proportion of water than calcium chloride dihydrate, the steps which consist in evaporating an aqueous solution of calcium chloride to form crystals of calcium chloride dihydrate, separating said crystals from the mother liquor, returning the separated mother liquor to said evaporating step, mixing said crystals with previously dried undersize particles of hydrated calcium chloride containing a substantially less proportion of water than calcium chloride dihydrate, heating the resulting mixture to melt the same, forming said melt into solidified particles, heating said particles to drive off water from the surface thereof whereby superficially dried particles are obtained containing a substantially less proportion of water than calcium chloride dihydrate, cooling said dried particles, separating the undersize particles from the dried and cooled product, and returning the separated undersize particles to said mixing step.

4. In a method of producing calcium chloride in the form of solid substantially non-caking hydrated particles containing a substantially less proportion of water than calcium chloride dihydrate, the steps which consist in evaporating a solution of calcium chloride at a temperature between 45° and 100° C. to form crystals of calcium chloride dihydrate, separating said crystals from the mother liquor, returning the separated mother liquor to said evaporating step, mixing said crystals with from 5 to 25 per cent by weight of previously dried undersized particles of hydrated calcium chloride containing a substantially less proportion of water than calcium chloride dihydrate, heating the resulting mixture to a temperature between 170° and 178° C. to form a melt, solidifying and flaking said melt, air drying the resulting flakes to produce particles containing a substantially less proportion of water than calcium chloride dihydrate, cooling with air said dried particles, separating the undersize particles from the dried and cooled product, and returning the separated undersize particles to said mixing step.

5. In a method of producing calcium chloride in the form of solid non-caking hydrated particles substantially free from dust-like particles, said particles containing a less proportion of water than calcium chloride dihydrate, the steps which consist in removing water from a calcium chloride solution by vacuum evaporation at a temperature between 45° and 100° C. to form crystals of calcium chloride dihydrate, separating said crystals from the mother liquor, returning the separated mother liquor to said evaporating step, mixing said crystals with previously dried undersize particles of hydrated calcium chloride containing a substantially less proportion of water than calcium chloride dihydrate so as to form a mixture containing between 69 and 71 per cent of calcium chloride, the balance being largely water, heating the resulting mixture to a temperature between 170° and 178° C. to form a melt, solidifying and flaking said melt, bringing said flakes into countercurrent relation with hot drying gases whereby the water content of said flakes is reduced substantially below that of calcium chloride dihydrate, cooling the dried product in air, separating the undersize particles from the dried and cooled product, and returning the separated undersize particles to said mixing step.

WILLIAM R. COLLINGS.